(12) United States Patent
LeCorney

(10) Patent No.: US 6,421,632 B1
(45) Date of Patent: Jul. 16, 2002

(54) METHOD OF MONITORING DISTURBANCES APT TO OCCUR AT RANDOM OR IN BURSTS

(75) Inventor: David C. LeCorney, Hägersten (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/294,437

(22) Filed: Apr. 20, 1999

Related U.S. Application Data

(63) Continuation of application No. PCT/SE97/01765, filed on Oct. 22, 1997.

(30) Foreign Application Priority Data

Oct. 22, 1996 (SE) .............................................. 9603873

(51) Int. Cl.[7] .............................................. G06F 11/00
(52) U.S. Cl. ...................................... 702/185; 714/704
(58) Field of Search ............................ 702/185, 75, 76, 702/193, 189, 190; 714/704; 370/234; 340/500, 506, 800; 700/90, 91

(56) References Cited

U.S. PATENT DOCUMENTS 5,274,625 A * 12/1993 Derby et al. ................. 370/234
5,311,513 A * 5/1994 Ahmadi et al.
5,359,593 A * 10/1994 Derby et al. ................. 370/234
5,377,195 A * 12/1994 LeCorney .................... 714/704

OTHER PUBLICATIONS

ITU–T, G.821, Aug. 1996 "Error Performance of International Digital Connection Operating at a Bit Rate Below the Primary Rate and Forming Part of an Integrated Services Digital Network".
ITU–T, M.3400, Apr. 1997 TMN Management Functions.

* cited by examiner

*Primary Examiner*—Marc S. Hoff
*Assistant Examiner*—Mohamed Charioui
(74) *Attorney, Agent, or Firm*—Nixon & Vanderhye P.C.

(57) ABSTRACT

A method using an algorithm-controlled monitoring of disturbances apt to occur at random or in bursts. Counting values are used for counting the disturbances. An abnormal event regarded to be a disturbance is first definded. Then, a base against which disturbances are to be counted is defined, followed by defining a unit to be used as a measure of a disturbance frequency. Values of the disturbance frequency are determined in a variety of circumstances, the values including a critical value fC of the disturbance frequency where the monitoring nominally issues an alarm. At the critical value there is determined a peakedness factor F that is a measure of how bursty the disturbances are. An inertia value J is chosen that is a measure of how fast or slowly the algorithm is desired to react to changes in the disturbance frequency, so as to achieve an acceptable compromise between speed and reliability of the monitoring.

55 Claims, 7 Drawing Sheets

| disturbance frequency | bias | value | risk of false result |
|---|---|---|---|
| fN, normal | -50% | 0.005 | 0.001 |
| fR, raised | -20 % | 0.005 | 0.1 |
| fC, critical | zero | 0.01 | not applicable |
| fE, excessive | + 25% | 0.0125 | 0.1 |
| fU, unacceptable | + 100% | 0.02 | 0.001 |

| disturbance frequency | bias | value | risk of false result |
|---|---|---|---|
| fN, normal | -50% | 0.05% | 1% |
| fR, raised | -20% | 0.08% | 20% |
| fC, critical | zero | 0.1% | not applicable |
| fE, excessive | + 25% | 0.125% | 20% |
| fU, unacceptable | + 100% | 0.2% | 1% |

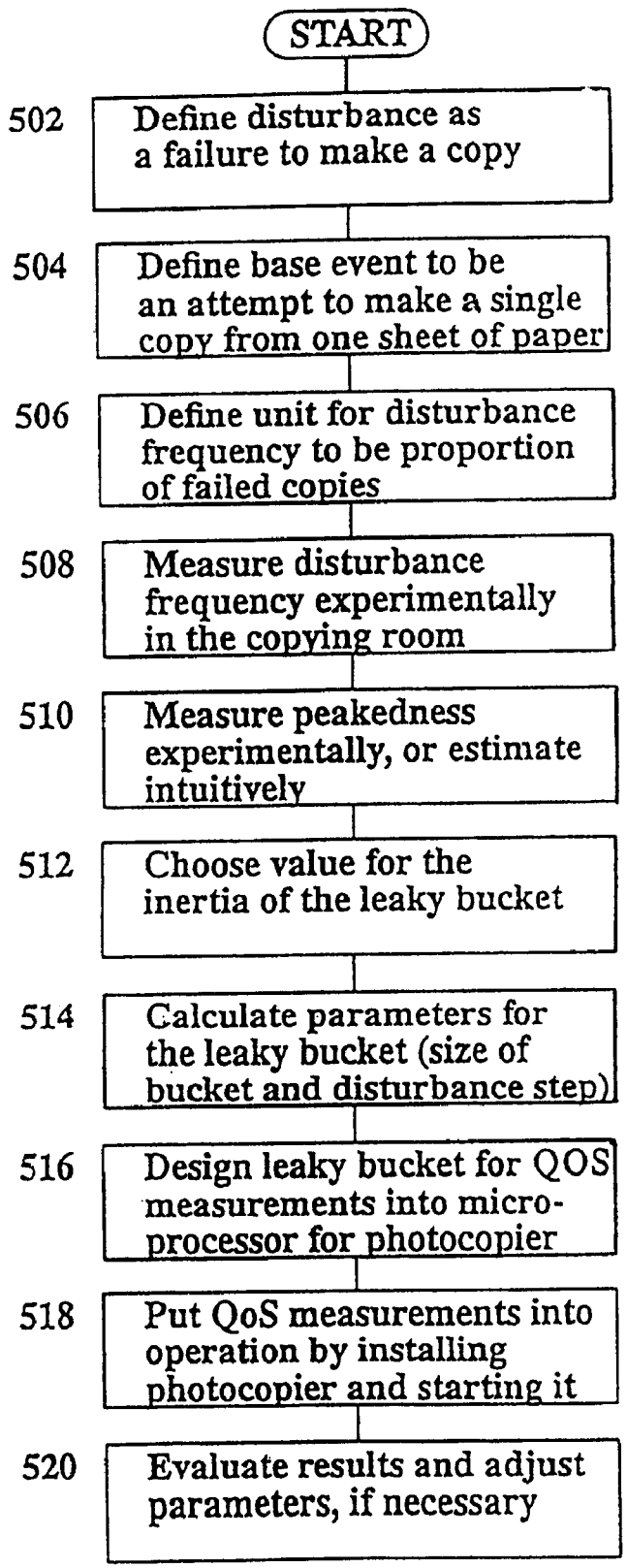

FIG. 8

| # | d | b | h | F | U(sol.1) | u (sol.2) | t(sol.2) |
|---|---|---|---|---|---|---|---|
| 1 | 10 | -0.1 | 10 | 1 | 0.238 | 0.245 | 249 |
| 2 | 20 | -0.1 | 10 | 1 | 0.236 | 0.243 | 499 |
| 3 | 30 | -0.1 | 10 | 1 | 0.236 | 0.243 | 749 |
| 4 | 40 | -0.1 | 10 | 1 | 0.235 | 0.243 | 999 |
| 5 | 100 | -0.1 | 10 | 1 | 0.235 | | |
| 6 | 1000 | -0.1 | 10 | 1 | 0.235 | | |
| 7 | 10000 | -0.1 | 10 | 1 | 0.235 | | |
| 8 | 10 | -0.1 | 20 | 2 | | 0.241 | 501 |
| 9 | 10 | -0.1 | 30 | 3 | | 0.240 | 753 |
| 10 | 10 | -0.1 | 40 | 4 | | 0.240 | 1005 |
| 11 | 10 | -0.1 | 20 | 1 | 0.103 | 0.106 | 786 |
| 12 | 10 | -0.1 | 30 | 1 | 0.0396 | 0.0406 | 1378 |
| 13 | 10 | -0.1 | 40 | 1 | 0.0145 | 0.0149 | 1941 |
| 14 | 10 | 0.111111 | 10 | 1 | 0.263 | 0.260 | 237 |
| 15 | 20 | 0.111111 | 10 | 1 | 0.263 | 0.260 | 474 |
| 16 | 10 | -0.2 | 10 | 1 | 0.0883 | 0.0925 | 203 |
| 17 | 20 | -0.2 | 10 | 1 | 0.0869 | 0.0917 | 407 |
| 18 | 10 | 0.25 | 10 | 1 | 0.0893 | 0.0889 | 177 |
| 19 | 20 | 0.25 | 10 | 1 | 0.0902 | 0.0898 | 353 |
| 20 | 10 | -0.25 | 10 | 1 | 0.0494 | 0.0520 | 180 |
| 21 | 20 | -0.25 | 10 | 1 | 0.0483 | 0.0510 | 359 |
| 22 | 10 | 0.333333 | 10 | 1 | 0.0451 | 0.0450 | 146 |
| 23 | 20 | 0.333333 | 10 | 1 | 0.0459 | 0.0458 | 293 |
| 24 | 10 | -0.333333 | 10 | 1 | 0.0169 | 0.0180 | 145 |
| 25 | 20 | -0.333333 | 10 | 1 | 0.0164 | 0.0174 | 290 |
| 26 | 10 | 0.5 | 10 | 1 | 0.0116 | 0.0116 | 105 |
| 27 | 20 | 0.5 | 10 | 1 | 0.0121 | 0.0121 | 210 |
| 28 | 20 | -0.5 | 10 | 1 | 0.00128 | 0.00133 | 200 |
| 29 | 20 | 1 | 10 | 1 | 0.0003 | 0.0003 | 108 |
| 30 | 20 | -0.5 | 5 | 1 | 0.0277 | 0.0289 | 96 |
| 31 | 20 | -0.2 | 5 | 1 | 0.208 | 0.219 | 135 |
| 32 | 20 | 0.25 | 5 | 1 | 0.252 | 0.249 | 121 |
| 33 | 20 | 1 | 5 | 1 | 0.0172 | 0.0171 | 56 |
| 34 | 20 | -0.5 | 20 | 1 | 0.000003 | 0.000003 | 401 |
| 35 | 20 | -0.2 | 20 | 1 | 0.0112 | 0.0118 | 977 |
| 36 | 20 | 0.25 | 20 | 1 | 0.0094 | 0.0094 | 812 |
| 37 | 20 | 1 | 20 | 1 | 0.0000001 | 0.0000001 | 208 |

METHOD OF MONITORING DISTURBANCES APT TO OCCUR AT RANDOM OR IN BURSTS

This is a continuation of PCT application No. PCT/SE97/01765, filed Oct. 22, 1997.

TECHNICAL FIELD OF THE INVENTION

The invention generally relates to the field of supervision or monitoring of errors, or "disturbances", in processes. As a specific field in this regard performance management according to TMN (Telecommunications Management Networks) standards of telecommunication operations can be mentioned, cf. ITUT-T Recommendation M.3400.

More particularly, the invention relates to a method for performing, in a computer-controlled process, an algorithm-controlled monitoring of disturbances apt to occur at random or in bursts in the process, said monitoring using counting values obtained from a counter for counting said disturbances.

There are many examples of disturbances in a software-controlled telecommunication system, among which can be mentioned parity errors, sporadic hardware faults, bit-correction errors, cyclic-redundancy-check (CRC) errors, congested call attempts, synchronization slip, protocol errors, signalling errors in line or register signalling, program exception during run-time, violation of the software contract at an interface.

There are also many cases of disturbance outside the field of telecommunications, such as errors appearing when making a copy on a photocopier, false results in a blood test, misfiring of an internal-combustion engine, production faults in the manufacture of an electronic component or of a printed-circuit board.

All such disturbances are unavoidable, and there is no reason to intervene for a single disturbance in order to find its cause. However, it is necessary to monitor automatically the disturbance rate or frequency. If the disturbance frequency remains at a low predictable and acceptable level, this can be accepted. But if the rate of disturbances rises to an unacceptable level, then the monitoring mechanism must raise an alarm, or send a notification, requesting manual intervention to find the cause of the excess disturbances.

DESCRIPTION OF RELATED ART

In the field of telecommunications, a specific form of disturbance monitoring has been known as "disturbance supervision", as described in U.S. Pat. No. 5.377.195, and implemented in the Ericsson AXE 10 system. Currently, the expression "QOS measurement" (Quality-Of-Service measurement) is used, as part of the performance management specified by TMN standards. QOS measurements do not consider the physical processes that cause disturbances.

QOS measurements are well specified by the standards, cf. for example, ITU-T G.821 on #7 signalling, concerning error rates. However, there are no guidelines on how to set thresholds so as to obtain meaningful results. In practice, thresholds are set empirically. There is no method for setting thresholds in a systematic way. Often, the results from QOS measurements are so unreliable that they are worse than useless. They give false results, and can be such an irritant to maintenance personnel that the measurements are turned off.

There are several possible algorithms that can be used in QOS measurements. One of these is the so-called Leaky Bucket algorithm. This algorithm is potentially a well usable algorithm for QOS, but it is associated with some problems which need to be solved. The mathematical analysis of the leaky bucket is not easy. There is too little knowledge available about the behaviour of the disturbances that need to be measured by QOS. In practice, disturbances do not occur at random, which is relatively easy to analyse, but in bursts, which is less easy. A satisfactory solution to the problem requires that bursty behaviour should be treated correctly. As the behaviour of QOS measurements is stochastic, no results are 100% reliable. There is always a risk of false positive or false negative results. These risks must be taken into consideration when setting good values for the thresholds.

In fact there have seemed to be no satisfactory solutions available to these problems.

SUMMARY

The method according to the invention, as defined by way of introduction, deals with the above discussed problems by comprising the steps of i) defining an abnormal event regarded to be a disturbance, ii) defining a base against which disturbances are to be counted, iii) defining a unit to be used as a measure of a disturbance frequency, iv) determining values of the disturbance frequency in a variety of circumstances that can be expected in operation of a process generating the disturbance to be monitored, said values including a critical value fC of the disturbance frequency where the monitoring nominally issues an alarm, v) determining for the process, at said critical value, a peakedness factor F, being a measure of how bursty the disturbances are, as the ratio of the variance to the mean of occurrences of disturbances in the process, vi) choosing for the algorithm an inertia value J being a measure of how fast or slowly the algorithm is desired to react to changes in the disturbance frequency, so as to achieve an acceptable compromise between speed and reliability of the monitoring, vii) calculating parameters for the monitoring based upon the disturbance frequency value fC, the peakedness factor F and the inertia value J, and using said parameters to calculate according to $1/fC*J*F$ a threshold value T of the counter considered to be unacceptable, iix) designing the algorithm for the monitoring with said parameters, ix) initiating the monitoring and waiting for results thereof, x) evaluating the results and, if necessary, adjusting the parameters.

In the above defined method the step of defining a base comprises determining whether the base should be a unit of time, a base event, or an artificial base, the outcome being a random variable able to take a value indicating normal event or disturbance.

In an important embodiment of the invention the condition is used that the disturbance frequency measured against all base events is indistinguishable from the frequency measured just against normal events.

In a further embodiment of the invention, there is determined, besides the value of the critical frequency, the values of one or more of the following further levels of the disturbance frequency:

fN=normal frequency in operation, fR=raised frequency in operation, but one that is still acceptable, fE=excessive frequency, at which the working of the equipment is degraded, fU=unacceptable frequency, where there are too many disturbances for normal operation.

In a further very important embodiment of the invention the bursty behaviour is considered solely on the basis of the peakedness factor, together with the disturbance frequency.

In one embodiment of the invention, using the Leaky Bucket algorithm, the value for the inertia is used as a multiplier on the size of the leaky bucket.

A further embodiment of the method according to the invention includes the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

In a further embodiment of the method according to the invention, the step of evaluating the results comprises a first substep of investigating whether measurements can be regarded as reliable, and, if yes, ending by taking no further action, a second substep that, if the first substep reveals that measurements are not reliable, comprises investigating three possible sources of error, viz. whether 1) there are too many false alarms, 2) faulty equipment stays in service, or 3) the time to get results is too long, and on a third substep level, performing either of the following three steps,
(i) if there are too many false alarms, increasing the value of fC, or increasing the value of J or F, by recalculating d and T and returning to first substep,
(ii) if faulty equipment stays in service without raising an alarm, reducing fC, or reducing J or F, recalculating d and T and returning to the first substep,
(iii) if the time to get results is too long, reducing the value of J or F, recalculating d and T and returning to the first substep.

According to an important embodiment of the invention, the evaluating step includes a step of determining the probability of obtaining a false result in the monitoring, based upon using a Leaky Bucket algorithm in which said probability is defined as u(d,b,h,F), wherein d=disturbance step is the amount by which a leaky bucket counter is incremented for each disturbance, b=bias is the expected change of a counter value after a base event, b<0 implying a false positive result obtained when alarm is given, even though there is nothing wrong with a supervised object, and b>0 implying a false negative result obtained when no alarm is given, even though there is something wrong with the supervised object, h=size of the bucket, measured in units of the disturbance step, F=peakedness factor for the disturbance process.

In the above connection, the step of determining the probability of obtaining a false result can include the substeps of entering as parameters:
disturbance step d, bias b and size h of bucket, initializing as variables:
r=P{normal event}/P{disturbance}, wherein P{normal event} means probability of a normal event appearing and P{disturbance} means probability of a disturbance appearing,
a=h*d being size of the bucket in units of 1, determining whether bias b=0, <0 or >0, calculating, if bias=0, boundaries of probability u(a/2), while using inequality $$\frac{(a-z)}{a} <= u(z) <= \frac{(a+d-z-1)}{(a+d-1)}$$

wherein u(z) means probability of hitting the floor of the bucket, given starting point z, producing upper and lower bounds, and average for the probability u(a/2), solving with binary search, if bias is not =0, the equation $f(s)=r+s^{**}(d+1)-(r+1)^*s=0$, in either the range 1<s<2 for b<0, or in the range 0<s<1 for b>0, wherein s is a dummy variable, calculating boundaries of probability u(a/2) using inequality $$\frac{(s^a - s^z)}{(s^a - 1)} <= u(z) <= \frac{(s^{(a+d-1)} - s^z)}{(s^{(a+d-1)} - 1)}$$

producing upper and lower bounds, and average, for probability u(a/2)

The step of determining the probability of obtaining a false result can include the substeps of entering as parameters:
disturbance step d, bias b, peakedness F and size h of bucket,
initializing as variables:
a state transition probability matrix:

$$\text{base event } X(n+1) = \quad 0 \quad 1$$

$$\text{base event } \quad X(n) = \begin{matrix} 0 & [p & q] \\ 1 & [Q & P] \end{matrix}$$

where:
P>q and Q<p;
p=P{X(n)=normal event, 0 & X(n+1)=normal event, 0},
q=P{X(n)=normal event, 0 & X(n+1)=disturbance, 1},
Q=P{X(n)=disturbance, 1 & X(n+1)=normal event, 0},
P=P{X(n)=disturbance, 1 & X(n+1)=disturbance, 1};
the steady-state probabilities for the two-state model are:
x=P{x(n)=0}=Q/(Q+q)
y=P{x(n)=1}=q/(Q+q)
probability distribution for time=0, performing in a loop through time t while weight ~>0.000001, weight being the probability of the counter remaining between the boundaries of the bucket, the substeps of
calculating probability P{state=0 & counter=i} at time=t+1, calculating probability P{state=1 & counter=i} at time=t+1, calculating probability P{counter hitting floor or ceiling} at time=t+1, calculating component of mean and mean square for duration of measurement at time =t+1, calculating weight, preparing for the next iteration of the loop by shifting values, and ending loop, calculating variance and standard deviation of duration for the measurement, producing probability of hitting floor and hitting ceiling, producing mean and standard deviation of duration.

BRIEF DESCRIPTION OF THE DRAWINGS

The invention will now be described more closely with reference to the accompanying drawings, on which FIG. 5 is a schematical flow chart illustrating use of the ten steps according to FIG. 1 for applying the method according to the invention on a malfunctioning photocopier, FIG. 8 is a table providing a comparison of the two solutions according to FIGS. 7a and 7b of the probability function.

DETAILED DESCRIPTION OF EMBODIMENTS

Figures 1, 3, 6:
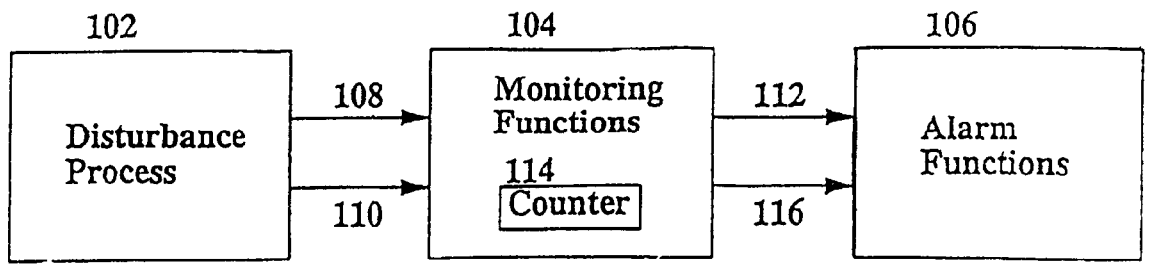
FIG. 1 is a block diagram schematically illustrating a basic framework of the method according to the invention.
FIG. 3 is an arbitrary risk table to be used in connection with step 6 of the flow chart according to FIG. 2.
FIG. 6 is a risk table to be used in connection with step 6 of the flow chart according to FIG. 5, FIGS. 7a and 7b are flow charts illustrating respective solutions of a probability function providing the probability of a false result in a QOS measurement for which the Leaky Bucket algorithm is used in connection with the method according to the invention.

The invention is basically a method for performing, in a computer-controlled process, an algorithm-controlled monitoring or supervision of disturbances apt to occur at random or in bursts in the process. For the supervision, counting values obtained from a counter for counting said disturbances are used. FIG. 1 illustrates in block diagram form the interrelationship between a process 102 exposed to disturbances, also referred to below as "disturbance process", functions 104 for monitoring or supervising disturbances apt to occur in the process 102, and alarm functions 106.

For each disturbance, the disturbance process 102 informs the the functions 104 by a disturbance signal, indicated by arrow 108. For each normal event in the disturbance process, the functions 104 are informed by a normal event signal, indicated by arrow 110.

When the monitoring functions 104 determine that a disturbance frequency is "too high" in some sense, the alarm functions 106 are informed by an alarm signal, indicated by arrow 112, from the monitoring functions 104. A block 114 indicates one or more counters in the monitoring functions 104 for counting the disturbances. If and when the disturbance frequency drops to an acceptable level, the alarm functions 106 are informed by an alarm end signal, indicated by arrow 116, from the monitoring functions 104.

The invention will now be described more in detail by way of embodiments. These embodiments will essentially be based upon the presumption that the algorithm used for QOS measurements will be the leaky bucket algorithm, henceforth also shortly referred to as "leaky bucket", or just "bucket".

Mathematical notations used below will include conventional notations, though some variables contain two or more alphanumeric characters, as is common practice within programming. For the most complicated mathematics mathematical notation is used. Otherwise, in running text, computing conventions are used, in particular slash is used for division, asterisk for multiplication, and double asterisk for exponent. Parentheses are used for indexing. P{ } is commonly used to denote probability. Consistent use has been made of single-letter variables, for example, d for disturbance step. There are only minor exceptions.

Figure 2:
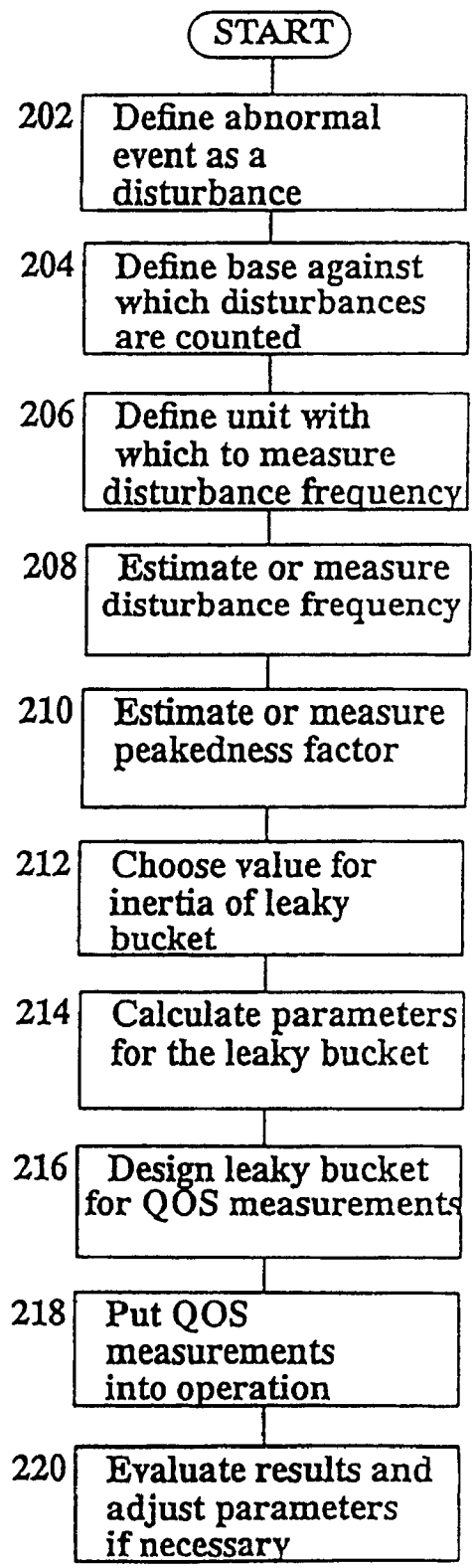
FIG. 2 is a schematical flow chart illustrating generally the method according to the invention in ten steps.

FIG. 2 is a flow chart in the form of a block diagram schematically illustrating the method according to the invention when used together with the leaky bucket algorithm.

A first step 202 is to define the abnormal event that is regarded as a disturbance, e.g. a bit error or a failed call. This step can be performed as described in U.S. Pat. No. 5,377,195 referred to earlier, and included herein by reference.

The next step, indicated at 204, is to define a base against which disturbances are counted.

The base can be:

Unit of time, e.g. the duration of one bit. A time-based disturbance process is called a "regular" disturbance process in the U.S. Pat. No. 5,377,195. Traditionally, the leaky bucket is used for time-based disturbance processes.

Base event, e.g. a call attempt. An event-based disturbance process is called an "irregular" disturbance process in the U.S. Pat. No. 5,377,195.

The concept of base event is used here in essentially the same way as in U.S. Pat. No. 5,377,195, although here the distinction between normal event and base event is made clear.

An artificial base, such as a unit of traffic-volume, e.g. an erlang-second.

In all three cases the outcome is a random variable X, which can take the values:

0=normal event, with probability, say x, and

1=disturbance, with probability, say y=1−x.

In the third step, indicated at 206 in FIG. 2, the unit with which to measure disturbance frequency is defined. Once the disturbance and the base are defined, according to the first and second steps, units have been found in which to measure the disturbance frequency, e.g. proportion of bit errors for a time-based disturbance process, percentage of failed calls for an event-based disturbance process, or proportion of errored seconds during speech for a traffic-based disturbance process.

It should be noted that the disturbance frequency y mentioned above, is assumed to be low, typically less than one percent. This means that the disturbance frequency measured against all base events, including disturbances, is indistinguishable from the frequency measured against just normal events, excluding disturbances. It is impossible to measure the difference between the two in practice, and the discussion below will swap between the two definitions when mathematically convenient. In other words, y is indistinguishable from y/x, when y<<1. This approximation will here be called the "disturbance approximation". Thus, the disturbance approximation is a mathematical approximation according to which the disturbance frequency measured against all base events is indistinguishable from the frequency measured just against normal events.

In the fourth step, indicated at 208 in FIG. 2, the disturbance frequency is estimated or measured in a variety of circumstances that can be expected in operation for the disturbance process being monitored. The disturbance frequency can be measured either directly by means of some apparatus, or by use of experience and intuition.

In particular, there are five values of disturbance frequency that can be of interest:

fN=normal frequency in operation, for example 0.5%, fR=raised frequency in operation, but one that is still acceptable, for example 0.8%, fC=critical frequency, at which the measurement nominally issues an alarm or a notification, for example 1.0%, fE=excessive frequency, at which the working of the equipment is degraded, for example 1.25%, fU=unacceptable frequency, where there are too many disturbances for normal operation, for example, 2%.

In the fifth step, indicated at 210 in FIG. 2, the peakedness factor for the process that generates disturbances is estimated or measured. Peakedness is a measure of how bursty the disturbance process is. The peakedness factor is defined by ITU-T, cf. CCITT, HANDBOOK ON QUALITY OF SERVICE AND NETWORK PERFORMANCE, Geneva, 1993, ISBN 92-61-04741-6, Rec. E.600, to be the ratio of the variance to the mean of a random variable. For example, if Y is the sum of many random variables X(i), where X(i) is distributed as X above, and if. further the variables X(i) are correlated, then the variance of Y will in general be inflated by a constant factor, known as peakedness.

Essentially, the peakedness factor can vary with the disturbance frequency. However, the only peakedness being of interest here is the peakedness at the frequency fC. There are many ways of measuring the peakedness of a disturbance process, depending on what is known or assumed about the process. The most important methods to be used in connection with the method according to the invention are summarized below:

If disturbances occur singly, and at random, then F=1.

If disturbances occur in a fixed number n in any burst, where the bursts occur at random, then F=n.

If the number of disturbances in any such random burst is geometrically distributed with mean m, then F=2m−1.

If the disturbances follow the two-state model described in U.S. Pat. No. 5,377,195, then F=determinant of the state matrix.

If the number of disturbances in any burst is distributed with mean m and variance V, and the bursts occur at random, then F=m+V/m.

If the correlation coefficient between the results of successive base events is c, then F=(1+c)/(1−c).

If the inter-arrival times of disturbances, measured against the base event, have variance V, and mean m, then F=V/(m**2), cf. "Analysis of Non-Poisson Disturbance Processes" (Chapter 2), Anna Gyllenstierna, (Master's Thesis at Ericsson Telecom, 1992). For example, if disturbances occur singly and fairly regularly, then F <1.

If the disturbances follow the three-state model or the Gilbert-Elliott model, then the peakedness can be calculated here too, cf. again the reference by Anna Gyllenstierna just mentioned. For example, using the results quoted for the three-state model in "Simulation of Burst-Error Modes and an Adaptive Error-Control Scheme for High-Speed Data Transmission over Analog Cellular Systems", Takuro Sato and others (IEEE, May 1991), then F typically takes the value of 20 or more for bit errors in data transmission over analogue cellular systems.

Using one or more of the methods above, the peakedness at the critical frequency can be either measured explicitly, or estimated by means of judgement and experience.

There are many models of varying complexity and validity, which describe the behaviour of a bursty disturbance process. The more complex the model, the more difficult it is to estimate the parameters for a particular disturbance process with any degree of reliability.

According to one essential feature of the invention a peakedness hypothesis is used that states that the only relevant information about the bursty behaviour of a disturbance process is contained within the value of the peakedness factor, together with the disturbance frequency. It is most likely that this hypothesis is valid for all practical purposes.

In the sixth step, indicated at 212 in FIG. 2, a value is chosen for the inertia of the leaky bucket algorithm. By inertia is here meant a measure of how fast or slowly the algorithm reacts to changes in the disturbance frequency, and is used as a compromise between reliability and reactivity for the QOS measurements. On the one hand, a small value of the inertia means that the algorithm reacts quickly, but at the price of many false results. On the other hand, a large value of the inertia gives reliable results, but at the price of taking a long time. Thus, a definition of "inertia" in the present context is that it is a multiplier on the size of the leaky bucket, a small value of the inertia giving fast, unreliable results, whereas a large value gives slow, reliable results.

Thus, no matter how well any QOS measurement is specified and designed, there is always a risk of a false result. A false positive can be obtained when a QOS alarm or notification is given, even though there is nothing wrong with the supervised object. A false negative can be obtained when no QOS alarm or notification is given, even though there is something wrong with the supervised object.

In general, if there are many supervised objects, which are not critical to the operation of the system, then false positives are the problem. The operational staff get irritated by false positives, and may tend to ignore them. In that case, the parameters for the QOS measurement must be chosen to give a low risk of false positives. However, the price of this decision is that the measurement reacts slowly when the supervised object genuinely causes too many disturbances. This case will be referred to below as case A.

On the other hand, if there are few supervised objects, which are critical to the operation of the system, it is important that the QOS measurements react quickly when the supervised objects cause too many disturbances. The price of this decision is that there will be a significant number of false positives. This case will be referred to below as case B.

The purpose of step 212 is to choose a value for the inertia which achieves a reasonable compromise between the conflicting goals of significance of results and speed at which results are obtained.

In order to obtain a qualitative understanding of the loss function, risks to obtain a false result are presented in the table according to FIG. 3.

At this stage, there exists a lot of information about the disturbance frequency, and the consequences of a false result, or of delay in obtaining results. This information may be very exact, or the information may be less precise, and based on intuition and experience.

In any event, a risk table of the kind indicated in FIG. 3 needs to be filled in. The four columns of the table indicate, in turn, level of disturbance frequency, bias, value of the disturbance frequency and risk of false result, respectively, bias being the expected change of a counter value after a base event. The values in columns 2–4 may be regarded as a typical set of values to illustrate the discussion.

In principle, any suitable set of values for the bias can be chosen. However, the values given in the table of FIG. 3 are both intuitive and easy to manage. The values of the disturbance frequency are then calculated by adjusting the critical frequency with the respective values of the bias. The values for the risks are then set based upon economic analysis, experience, judgement or intuition.

When this table has been filled in, the biases and the risks should be compared with the values for the bias, b, and the risk, u, appearing in the table according to FIG. 8, to be described in detail later on. Then a suitable value for the height h should be chosen, bearing in mind that h=J*F, where J=inertia and F=peakedness. In this example, we can see that the value J=10 matches the risks very well. If the table according to FIG. 8 should not give sufficient guidance, then one or both of two methods to be described later on with reference to FIGS. 7a, 7b and written programs denominated "BUCKET" and "CLOUD" should be used. A study of table 8 shows that 20 is a high value of J (case A), 5 is a low value of J (case B) and 10 is an intermediate value.

In the seventh step, step 214 in FIG. 2, the parameters for the leaky bucket are calculated. This step comprises two substeps. The first substep sets disturbance step d=1/fC, where fC is the critical frequency at which the QOS measurement nominally raises an alarm. Using the values in the table according to FIG. 3, d=100. The second substep sets the size of the leaky bucket, or threshold, T, to d*J*F, where J=inertia and F=peakedness as indicated above. Using the values in the table of FIG. 3, T=2000, assuming a peakedness of 2.

In the eighth step, step 216 in FIG. 2, the leaky bucket is designed for QOS measurements. This step is relatively straightforward. U.S. Pat. No. 5,377,195 describes one way.

In the ninth step, indicated at 218 in FIG. 2, the QOS measurements are put into operation, e.g. by using the leaky bucket. By this is just meant initiating the measurements, and waiting for the results.

In the tenth step, indicated at 220, the results are evaluated and, if necessary, the parameters are adjusted. There will be operational experience of the measurements after a few days or weeks. Without describing in detail how to evaluate the results, and referring to the flow chart of FIG. 4, it is likely that one of the following cases of conclusions and corresponding actions will appear.

Figure 4:
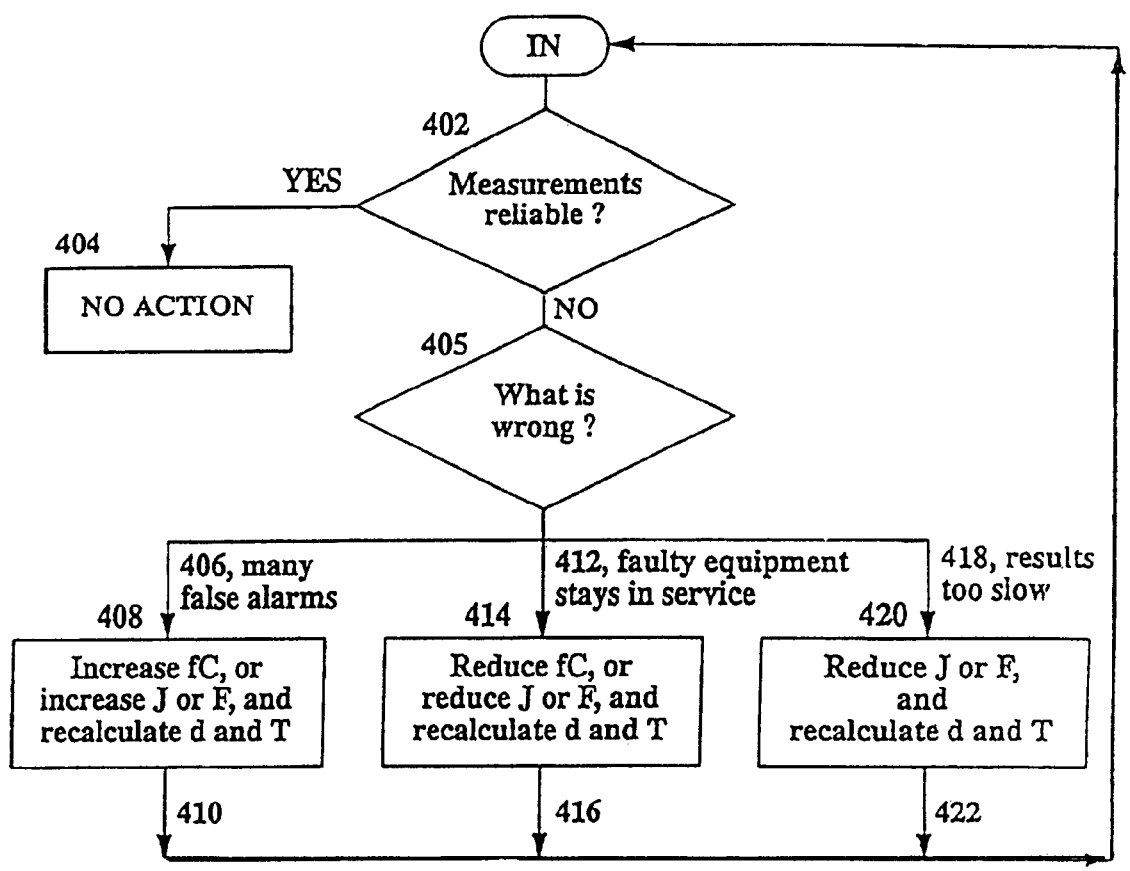
FIG. 4 is a schematical subflow chart of step 10 of the flow chart according to FIG. 2.

In FIG. 4, step 402 starts by investigating whether measurements can be regarded as reliable. If yes, the process ends in block 404 indicating that no action is taken. By the measurements being reliable is meant that any alarms raised are significant in that they identify faulty equipment and that there is no evidence of faulty equipment that does not raise an alarm.

If no in step 402, the process proceeds to step 405 to determine what is wrong. Three possible sources of error are investigated, viz. whether 1) there are too many false alarms, 2) faulty equipment stays in service, or 3) the time to get results is too long.

If, in step 405, the number of false alarms is found to be such that it can be regarded as not acceptable, the process proceeds, arrow 406, to taking actions according to block 408. By a false alarm is meant that no fault can be found on an indicated equipment. These actions consist in increasing the value of fC, or increasing the value of J or F, followed by recalculating d and T. The process then returns to step 402 according to arrow 410.

If, in step 405, it is found that there is clear evidence that faulty equipment stays in service without raising an alarm, the process proceeds, arrow 412, to taking actions according to block 414. These actions consist in reducing fC, or reducing J or F, followed by recalculating d and T. The process then returns to step 402 according to arrow 416.

If, in step 405, it is found that the time for getting any results from the QOS measurements can be regarded as unacceptably long, the process proceeds, arrow 418, to taking actions according to block 420, consisting in reducing J or F followed by recalculating T. The process then returns to step 402 according to arrow 422.

An example consisting in dealing with the problems of a malfunctioning photocopier following similar steps as in FIG. 2, will now be described with reference to FIG. 5, showing a flow chart in the form of a block diagram.

Many people have experienced the frustration of using a malfunctioning photocopier. Yet, even a malfunctioning machine only fails sometimes, and not every time it makes a copy.

As a first step, block 502, the disturbance is defined to be a failure to make a copy. Or more exactly, the machine stops and gives a fault code that requires manual intervention.

In the next step, block 504, the base event is defined to be an attempt to make a single copy of a single sheet. The QOS measurement is therefore event-based.

In the third step, block 506, the unit for disturbance frequency is defined as being the proportion, or percentage, of failed copying attempts.

As a fourth step, block 508, the disturbance frequency is measured. This can be done in a copying room, by counting the number of times manual intervention was needed, and dividing it by the number of sheets copied in the same period. On the basis of experience, the following values of frequency seem reasonable: fN=0.05%, fR=0.08%. fC=0.1%, fE=0.125%, and fU=0.2%.

As a fifth step, block 510, the peakedness is measured. Peakedness can be measured experimentally in the copying room. However, a value of F=3 is chosen intuitively, on the basis that a photocopier often fails a couple of times in a short period, and then continues to function normally again.

In the sixth step, block 512, a value for the inertia is chosen. The procedure is started by choosing a loss function. Reasonable costs are one dollar for each disturbance, and 100 dollars for each false alarm. Without analysing the loss function in detail, a suitable risk table can be the one shown in FIG. 3.

Comparing the values in this table with the values in the table according to FIG. 8, it can be seen that J=5, is a suitable value for the inertia.

In the seventh step, block 514, the parameters are calculated. Disturbance step d=1/fC=1000. Threshold T=d*J*F=1000*5*3=15000.

In the following step, block 516, the QOS measurement is designed. This is straightforward, and can be as described in U.S. Pat. No. 5,377,195. The leaky bucket algorithm should be designed into the microprocessor in the photocopier. It should be designed, so that each time the bucket empties, i.e. a negative result, the measurement is restarted. If the bucket overflows, i.e. a positive result, a signal is sent automatically to a maintenance centre. It is a matter of choice whether the machine should be taken out of operation or not. A likely solution is that the machine is left in operation, but with a warning light, saying that it is malfunctioning, and that maintenance has been requested.

In the ninth step, block 518, the QOS measurement is put into operation. In this case, install the copying machine, and start using it.

In step 10, block 520, the results are evaluated. If the results of the measurements are satisfactory, nothing has to be done. The maintenance engineer is only called when the operation statistics genuinely are bad. However, if there is a clear problem with false positives or negatives, then the numbers above must be adjusted until the; results are satisfactory as has been explained with reference to FIG. 4.

The most important advantage of the invention is that QOS measurements will provide meaningful results that justify the expense of designing them and putting them into operation. Generally, this does not seem to be true for prior art systems.

Above, embodiments of the invention have been described in connection with using the leaky bucket algorithm in QOS measurements. There are other algorithms in use today, with relative strengths and weaknesses. These algorithms share the problem in setting thresholds to meaningful values.

The invention is intended primarily for automatic monitoring or supervision of disturbances within modern telecommunications. However, the invention is just as applicable to other areas of QOS measurements, such as manufacture of printed-circuit boards.

Above it has been assumed that the disturbance approximation should be valid only for low frequency disturbances. However, empirical results from leaky bucket analysis suggest that this assumption is not necessary, but that the results can be extended also to high-frequency disturbances. There are some important examples of high-frequency disturbances, such as manufacturing, where the yield is less than 99%, quality supervision of shortholding-time calls in order to identify poor transmission links, or bit errors in transmission for digital mobile telephony (GSM).

In the case of GSM transmission, it has turned out that transmission quality is lower than predicted since the effect of bursty behaviour has been ignored.

Two solutions, referred to here as solution (1), or "BUCKET", and solution (2), or "CLOUD", respectively, for determining the probability of a false result in a QOS measurement will now be described. As these solutions presuppose, as an example, use of the Leaky Bucket algorithm the description will start with a brief analysis of the Leaky Bucket algorithm.

Define a probability function u(d, b, h, F) where:
d=disturbance step, as described in U.S. Pat. No. 5,377,195, that is the amount by which a leaky bucket counter is incremented for each disturbance.
b=bias, also as in U.S. Pat. No. 5,377,195, that is the expected change of a counter value after a base event. For example, if y=probability of a disturbance, and x=1−y=probability of a normal event, then b=y*d−x.
h=height, or size of the bucket, measured in units of the disturbance step. This measure is not used explicitly in U.S. Pat. No. 5,377,195, but is implicit in the reliability constant mentioned therein.
F=peakedness factor for the disturbance process.
u(d, b, h, F) is defined to be the probability of a false result in a QOS measurement. That is:
if b<0, u=P{bucket overflows}, that is false positive result, henceforth being referred to shortly as "false positive".
if b>0, u=P{bucket underflows}, that is false negative result, henceforth being referred to shortly as "false negative".

If b=0, then the value of u is of little interest, but is defined to be 0.5 anyway.

Now u cannot be solved analytically. However, the two solutions (1), "BUCKET", and (2), "CLOUD", provide satisfactory "semi-analytical solutions", that involve combination of mathematical analysis and arithmetic calculation in a computer program.

Solution (1), "BUCKET":

If the disturbance process generates random, single disturbances, and is monitored by a leaky bucket, then we can describe this situation as a bounded, asymmetrical random walk. The mathematical tools for analysing a random walk are well-documented, for example, in "An Introduction to Probability Theory and its Applications", Volume 1, Chapter 14, by William Feller. Reference will be made below to this work by Feller.

Using Feller's own notation, the floor, or lower threshold for the leaky bucket is set to zero, and the ceiling, or upper threshold, T is set to the positive value, a. Further, the starting point of the counter is not necessarily in the middle, but can be any value z between zero and a inclusive.

In general, P{k} is the probability of the counter moving upwards by k steps. But in our random walk, P{k}=0 for all k except d and −1, where d is the disturbance step.

Feller's characteristic equation (8.5) gives:

$$\sum_{k=-\infty}^{\infty} P\{k\}s^k = 1 \text{ which simplifies to: } \frac{p}{s} + qs^d = 1$$

where p=P{−1}=probability of the counter stepping down by one, and q=P{d}=probability of the counter stepping up by d.

By convention, the probability of hitting the floor is known as the probability of ruin, u(z), given starting point z.

Now this equation cannot be solved explicitly, but in the simple case where p=q*d (that is, bias b=0) we use Feller's equation (8.11):

$$\frac{(a-z)}{(a+n-1)} <= u(z) <= \frac{(a+m-z-1)}{(a+m-1)}$$

m corresponds to Feller's Greek mu=d, and n corresponds to Feller's Greek nu=−1.

This results in inequality (1):

$$\frac{(a-z)}{a} <= u(z) <= \frac{(a+d-z-1)}{(a+d-1)}$$

However, in the more general case p is not equal to q*d, that is, the random walk is biased. Then we must solve the characteristic equation by means of a binary search. It should be observed that there are two different cases, depending on whether p is greater or less than q*d. If p<q*d, bias b>0, and if p>q*d, bias b<0.)

Feller's equation (8.12) states:

$$\frac{(s^a - s^z)}{(s^a - s^{(1-n)})} <= u(z) <= \frac{(s^{(a+m-1)} - s^z)}{(s^{(a+m-1)} - 1)}$$

In our case, this becomes inequality (2):

$$\frac{(s^a - s^z)}{(s^a - 1)} <= u(z) <= \frac{(s^{(a+d-1)} - s^z)}{(s^{(a+d-1)} - 1)}$$

Thus we have upper and lower bounds for u(z).

The program, "BUCKET", solves this inequality for u(z). It can be seen that the upper and lower values of u(z) are close to each other, and the program just naively calculates the arithmetic mean of the two values.

When the bias is negative, then u(z) is close to one. As the probability of a false result is of more interest than the probability of ruin, the value of u(z) is replaced by 1−u(z) and prefixed with a minus sign.

The solution (1), "BUCKET", is illustrated by the flow diagram of FIG. 7a and a corresponding program written as follows in the language C++.

```
BUCKET
#include <iostream.h>
#include <math.h>
//If the bias, b = 0, the probability of hitting the floor, that is
//the probability of ruin, u(z) is calculated by inequality (1) above.
//However, if the bias, b is not equal to zero, a binary search must
//first be done.
//This search solves the equation p/s + q.s**d = 1.
//This is the same as solving the equation:
//f(s) = r + s**(d+1) − (r+1).s = 0, where r = p/q.
//Then u(z) is evaluated by inequality (2) above.

//If the bias is negative, then it is more interesting to know
//the probability of hitting the ceiling, which is indicated with
//a (meaningless) minus sign.

//In this version of the program, d, b, and h are entered by hand,
//and the starting point for the random walk is fixed to the
middle value.
main( ) { double d, r, a, b, h, z;
    double uz, uzl, uzr; // u(z) and its left and right values
    double s, sl, sr, sm; // s and its left, right and middle values
    double fsl, fsr, fsm; // left, right and middle values of f(s)
    double sdl, sa, sz, sadl; //intermediate variables for s to the
    power of . . . int i; //dummy variable
    float delta;

cout << "\nEnter disturbance step, d : ";
    cin >> d;
    //Feller uses c, whereas this program uses d for the disturbance step cout << "\nEnter bias, b : ";
    cin >> b;

cout << "\nEnter height, h, of ceiling, in units of d : ";
    cin >> h;

r = (d−b)/(1+b); //r = p/q in the random walk a = h*d; //Feller uses a for the ceiling, or upper threshold, T //Floor or lower threshold = 0

//random walk starts a= z = a/2;

if (b==0) { //unbiased walk
        //uz are lower and upper probabilities of hitting floor
        //that is probability of ruin (inequality (1))

for (z=a/2; z<a; z=z+a) { //trivial loop
            uzl = (a−z)/a;
            uzr = (a+d−z−1)/(a+d−1);
            uz = (uzl+uzr)/2;
            cout << " " << uz ;
        }
    } else { //biased walk
        if (b<0) { //negative bias
            //binary search between 1 and 2
            sl = 1.000001;
            sr = 2;

s = sl;
            sdl = exp((d+1)*log(s));
            fsl = r − sdl − (r+1)*s;

s = sr;
            sdl = exp((d+1)*log(s));
            fsr = r + sdl − (r+1)*s;
            //that was the initial conditions
            //now start the search for (i = 1; i <= 40; i++) {
                sm = (sl + sr)/2;
                s = sm;
                sdl = exp((d+1)*log(s));
                fsm = r + sdl − (r+1)*s;
                if (fsm < 0 ) {
                    sl = sm;
                    fsl = fsm;
                }
                else {
                    sr = sm;
                    fsr = fsm;
                }
                delta = sr − sl;
                if (delta < 0.000000001) {
                    s = sm;
                    goto solved;
                }
            }
        }
        else { //positive bias
            //binary search between 0 and 1
            sl = 0.000001;
            sr = 0.999999;

s = sl;
            sdl = exp((d+1)*log(s));
            fsl = r + sdl − (r+1)*s;
            s = sr;
            sdl = exp((d+1)*log(s));
            fsr = r + sdl − (r+1)*s;

//that was the initial conditions
            //now start the search for (i = 1; i <= 40; i++) {
                sm = (sl +sr)/2;
                s = sm;
                sdl = exp((d+1)*log(s));
                fsm = r + sdl − (r+1)*s;
                if (fsm > 0 ) {
                    sl = sm;
                    fsl = fsm;
                }
                else {
                    sr = sm;
                    fsr = fsm;
                }
                delta = sr − sl;
                if (delta < 0.000000001) {
                    s = sm;
                    goto solved;
                }
```

-continued

```
130         }

}
        solved:
        //uz are lower and upper probabilities of hitting floor
135     //that is probability of ruin (inequality (2))

for (z=a/2; z<a; z=z+a) { //trivial loop
            sa = exp(a*log(s));
            sz = exp(z*log(s));
140         sad1 = exp((a+d-1)*log(s));

uzl = (sa - sz)/(sa - 1);
            uzr = (sad1 - sz)/(sad1 - 1);
            uz = (uzl+uzr)/2;
145
            if (b<0) {
                uzl = uzl - 1;
                uzr = uzr - 1;
                uz = uz - 1;
150         } cout << "\nleft, mean, and right values of u(z) :";
            cout << "\n" << uzl << "   " << uz << "   " << uzr;
        }
155 } cout << "\n\n" ;
    }
160
```

Figure 7A:
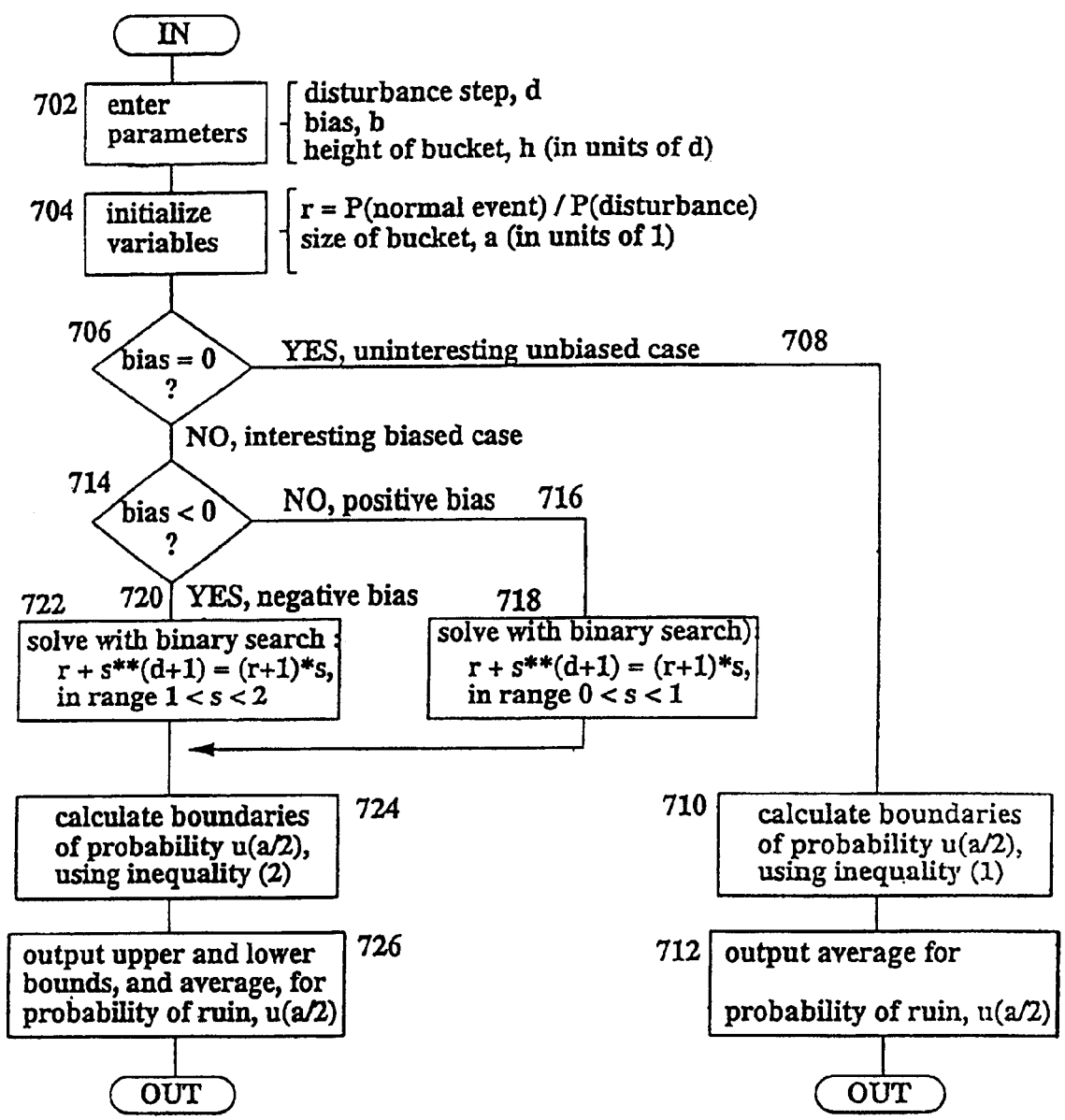

Referring now to FIG. 7a and the above program "BUCKET" the parameters disturbance step d, bias b and height of bucket, h are set in step 702, lines 29–37 of the program BUCKET. The parameter h is in units of d.

Step 704 initializes the variables r=P{normal event}/P{disturbance}, and size of bucket, a, as indicated in lines 39–45 of the program BUCKET. The variable a is in units of 1.

In step 706 it is decided whether the bias is or is not equal to zero, line 47 of the program BUCKET. If the bias b=0, being the uninteresting unbiased case, arrow 708, the probability of hitting the floor, that is the probability of ruin, u(z) is calculated by inequality (1). More particularly this is performed by calculating, in step 710, boundaries of probability u(a/2), using inequality (1), lines 48–53 of the program BUCKET, and outputting, in step 712, upper and lower bounds, and average, for probability of ruin, u(a/2), lines 54–55 of the program BUCKET.

If step 706 reveals that the bias is not equal to zero, a binary search must be done. This search solves the equation p/s+q.sd=1. This is the same as solving the equation: f(s)=r+s(d+1)−(r+1)*s=0, where r=p/q. This is preceded by continuating, line 59 of the program BUCKET, to step 714, for determining whether the bias is positive or negative, line 60 of the program BUCKET.

If positive, arrow 716, line 96 of the program BUCKET, the equation is solved in the range 0<s<1, step 718, as indicated in lines 97–130 of the program BUCKET. If the bias is negative, arrow 720, then the equation is solved, step 722, in the range 1<s<2, lines 61–94 of the program BUCKET.

Then, both for positive bias and for negative bias, u(z) is evaluated by inequality (2). More particularly, this is performed by calculating, in step 724, boundaries of probability u(a/2) using inequality (2), lines 134–143 of the program BUCKET, and outputting, in step 726, upper and lower bounds, and average, for probability of ruin, u(a/2), lines 144–153 of the program BUCKET. Solution (2) "CLOUD":

This is a supplement to the solution (1), done for the following reasons:

to confirm the results of solution (1), to investigate the effects of the peakedness.

The program CLOUD uses a two-state model of a type as described in U.S. Pat. No. 5,377,195, with the following state transition probability matrix:

$$\text{base event} \quad X(n+1) = \quad \begin{matrix} 0 & 1 \end{matrix}$$

$$\text{base event} \quad X(n) = \begin{matrix} 0 \\ 1 \end{matrix} \begin{bmatrix} p & q \\ Q & P \end{bmatrix}$$

where:

P>q and Q<p;

p=P{X(n)=normal event, 0 & X(n+1)=normal event, 0}, q=P{X(n)=normal event, 0 & X(n+1)=disturbance, 1}, Q=P{X(n)=disturbance, 1 & X(n+1)=normal event, 0}, P=P{X(n)=disturbance, 1 & X(n+1)=disturbance, 1};

The steady-state probabilities for the two-state model are:

x=P{x(n)=0}=Q/(Q+q)

y=P{x(n)=1}=q/(Q+q)

Then, in the program CLOUD:

Let Y0(i,t)=P{state=0 and counter=i at time t}, and Y1(i,t)=P{state=1 and counter=i at time t}.

Let Z0(i,t)=P{state=0 and counter=i at time t+1}, and Z1(i,t)=P{state=1 and counter=i at time t+1}.

Then, in the middle of the bucket:

$$Z0(i,t)=p*Y0(i+1,t)+Q*Y1(i+1,t) \text{ and}$$

$$Z1(i,t)=q*Y0(i-d,t)+P*Y1(i-d,t).$$

At the lower boundary zero, Y0(0,t)=P{lower threshold has been reached by time t}. At the upper boundary C, Y1(C,t)=P{upper threshold has been reached by time i}. Both Y0(0,t) and Y1(C,t) can be calculated by summing probabilities in a correct way, to be described more in detail further on with reference to FIG. 7b.

Now, the upper and lower boundaries of the bucket can be regarded as probability sinks. That is, as time t proceeds, more and more probability is absorbed by the sinks, and the weight w of the probability remaining between the boundaries becomes less and less. This probability between the boundaries is sometimes referred to as probability remaining "in the cloud" between the boundaries. When the weight w is sufficiently small, we can say that we have calculated the probabilities to a sufficient degree of accuracy.

The program "CLOUD", calculates these probabilities, using a notation consistent with the explanation above, and with the notation used to describe the two-state model. Input to the program is the disturbance step d, the bias b, the height h, and peakedness F>=1. Using this data, the start values for the bucket are calculated.

The explanation above should be sufficient to understand all the details in the program.

It should also be observed:

If F=1, the problem simplifies to the one-state model.

If F<1, the program does not work.

It is quite easy to generalize the program to any multi-state model for disturbance processes.

Figure 7B:
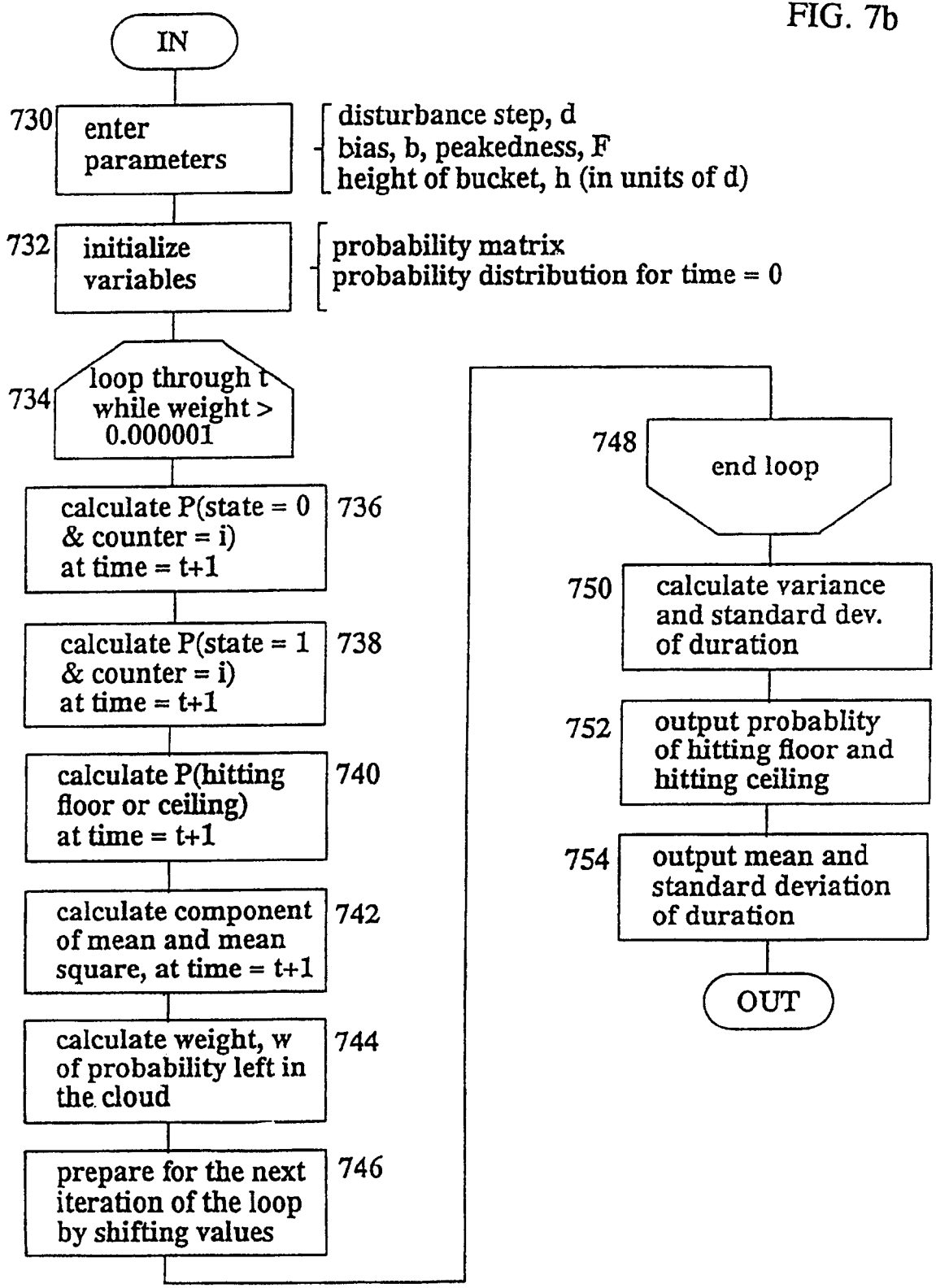

The solution (2), "CLOUD", is illustrated by the flow diagram of FIG. 7b and the following corresponding program written in the language C++.

```
CLOUD
#include <iostream.h>
#include <math.h>

//The purpose of this program is to calculate directly the probabili-
//ties of a bucket being in a particular state, at a particular time.
//In this program the two-state model mentioned above is used.
//The program is used to study the relationship between the
// peakedness and the height.

main( ) { int t=0; //time
    int i; //dummy variable
    int d; //disturbance step
    double Y0 [1001]; //current state probabilities in state zero
    double Y1 [1001]; //current state probabilities in state one
    double Z0 [1001]; //next state probabilities in state zero
    double Z1 [1001]; //next state probabilities in state one
    int C; //Ceiling
    int h; //height of ceiling, measured in disturbance steps
    double b; //bias
    double F; //peakedness factor (must be >= 1)
    double r; //determinant of the matrix in the two-state model
    double p, q, P, Q; //probabilities as in the two-state model
    double x, y; //steady-state probabilities
    double w=1; //weighs left in cloud
    double check; //dummy variable used for checking the weight
    double mean, mean2, variance, sd; //
    double pt; //probability of hitting floor or ceiling at current t for (i=0 ; i<=1000; i++) {
        Y0[i] = 0;
        Y1[i] = 0;
        Z0[i] = 0;
        Z1[i] = 0;
    }
    //Y and Z set to zero
    mean = 0;
    mean2 = 0;

cout << "\nEnter disturbance step d, bias b ,
    height h and peakedness F : "; cin >> d >> b >> h >> F;

C = h*d;
    r = (F-1)/(F+1);
    q = (1-r)*(1+b)/(d+1);
    Q = (1-r)*(d-b)/(d+1);
    p = 1-q;
    P = 1-Q;
    x = Q/(Q+q);
    y = q/(Q+q);
    Y0[C/2] = x;
    Y1[C/2] = y;
    cout << "\nr : " ;
    cout << r ;

cout << "\np, q : ";
    cout << p <<"  " << q ;

cout << "\nQ, P : ";
    cout << Q << "  " << P ;

cout << "\nx, y : ";
    cout << x << "  " << y;

for (t=1 ; w >= 0.000001 ; t++) {
        Z0[0] = Y0[0] + p*Y0[1] + Q*Y1[1];
        for (i=1 ; i<C-1; i++) {
            Z0[i] = p*Y0[i+1] + Q*Y1[i+1]
        }
        Z0[C-1]=0;
        Z1[C] = Y1[C];

for (i=C-1 ; i>=C-d ; i--)
            Z1[C] = Z1[C] + q*Y0[i] + P*Y1[i];
```

```
        for (i=C-1; i>d ; i--)
            Z1[i] = q*Y0[i-d] + P*Y1[i-d];

for (i=0; i<=C; i++)
            pt = Z1[C] - Y1[C] + Z0[0] - Y0[0];

mean = mean + pt*(t+1);
        mean2 = mean2 + pt*(t+1)*(t+1);

w = 1 - Z0[0] - Z1[C];

check = 0;
        for (i=1 ; i<C ; i++)
            check = check + Z0[i] + Z1[i];

for (i=1 ; i<=C ; i++) {
            Y0[i] = Z0[i];
            Y1[i] = Z1[i];
        }
        Y0[0] = Z0[0];
        Y1[C] = Z1[C];
    } cout << "\nweight = :" << w <<"   " << check;
    cout << "\nZ0[0] and Z1[C] : " <<Z0[0] << "   " << Z1[C] ;

variance = mean2 - mean*mean;
    sd = sqrt(variance);
    cout << "\n\nmean, standard deviation and current t : " ;
    cout << mean << "   " << sd << "   " << t ;

cout << "\n\n" ;
}
```

Referring now to FIG. 7b and the above program "CLOUD", step 730 enters the parameters disturbance step d, bias b, peakedness F, height h of bucket in units of d, lines 44–45 in the program CLOUD. Step 732 initializes as variables the above mentioned matrix providing steady-state probabilities for a base event being a normal event or a disturbance, as well as the probability distribution for time= 0, lines 33–42 and 47–67 in the program CLOUD.

Block 734 introduces start of a loop through t while weight>0.000001, line 70 in the program CLOUD. As mentioned above, by weight is meant the probability of the counter remaining between the boundaries of the bucket. The loop includes the following steps.

Step 736: calculate P{state=0 & counter=i} at time=t+1, lines 71–76 in the program CLOUD.

Step 738: calculate P{state=1 & counter=i} at time=t+1, lines 78–84 in the program CLOUD.

Step 740: calculate P{counter hitting floor or ceiling} at time=t+1, lines 86–87 in the program CLOUD.

Step 742: calculate component of mean and mean square for duration of measurement at time=t+1, lines 89–90 in the program CLOUD.

Step 744: calculate weight w of probability left in the cloud, line 92 in the-program CLOUD.

Step 746: prepare for the next iteration of the loop by shifting values, lines 98–103 in the program CLOUD.

Block 748 indicates end of the loop, line 105 of the program CLOUD, after which the following further steps follow.

Step 750: calculate variance and standard deviation of duration for the measurement, lines 110, 111 in the program CLOUD.

Step 752: produce probability of hitting floor and hitting ceiling, line 108 in the program CLOUD.

Step 754: produce mean and standard deviation of duration, lines 112, 113 in the program CLOUD.

In the table of FIG. 8, a selection of values of u are given for interesting combinations of d, b, h and F. In most cases, that is where possible, results are given from both programs so that they can be compared. When solution (2) is used to calculate u, the mean time t for bucket to overflow or underflow is also given. The results have been indexed in the left-hand column to make it easier to understand the conclusions.

Based upon an empirical study of the results from the solutions (1) and (2) the following conclusions have been drawn:

When both solutions can be used, that is, for small values of h and d, and for F=1, the separate solutions give consistent results. This confirms that the reasoning for both solutions is correct. (All results except #5–#10)

Solution (1) gives values of u for all values of d, b, and h, provided F=1. (All results except #8–#10)

Solution (2) gives values of u, in principle for all values of d, b, h, and F. But the execution time becomes excessive when d*h>=400. (All results except #5–#7, but #10 and #13 take a long time to execute.)

Solution (2) gives values of t. In principle, t can be obtained by the same method as in solution (1) as well. Feller recommends a method. (All results except #5–#7.)

Time t is proportional to d. (#1–#4, #14–#15, and #16–#17 etc.)

Time t increases linearly with h. (#1, #11, #12, #13)

Time t is proportional to F, when h increases with F. (#1, #8, #9, #10.)

For constant u, h is proportional to F. This is empirical verification of a theoretically derived result in U.S. Pat. No. 5,377,195 (#1, #8, #9, #10.)

Probability u is independent of d. (#1–#7, #14–#15 etc.)

For fixed b and F, u can be approximated by A*(B**h), where A and B are constants dependent on d and F. (#1, #11, #12, #13.)

There is an approximate symmetry in the dependence of u on b, that is: u(b)~=u*(-b/(1+b)). (#1 and #14, #16 and #18, #20 and #22, #24 and #26, #28 and #29.)

The disturbance approximation does not appear to be necessary. Useful results can be obtained even for high disturbance frequencies. (#1–#5.)

These conclusions are approximate, but accurate enough for practical purposes. The errors in most cases are just a few percent.

As regards peakedness for randomly occurring bursts the following conclusions have been drawn.

Suppose that Y is the sum of N independent, identically distributed random variables X(i), each with mean m, and variance V. Suppose also that N is itself a random variable, Poisson distributed and with mean 1.

Then, it can be proved that the mean of Y=1 *m, and that the variance of Y=1 *(V+m**2). Further, the peakedness of Y=variance/mean=m+V/m.

Now, if each X represents the number of disturbances in a disturbance burst, and Y represents the number of disturbances generated by a disturbance process during a long time interval, then the peakedness for Y is easily calculated from the mean and variance for the individual bursts, that is, m+V/m.

This simple formula can be applied to all multi-state models for disturbance processes in order to calculate the peakedness. For example, when applied to the two-state model, we get confirmation of the value for the peakedness.

What is claimed is:

1. A method for performing, in a computer-controlled process, an algorithm-controlled monitoring of disturbances which may occur at random or in bursts in the process, said monitoring using counting values obtained from a counter for counting said disturbances, said method comprising:
   i) defining an abnormal event regarded to be a disturbance,
   ii) defining a base against which disturbances are to be counted, comprising determining whether the base should be a unit of time, a base event, or an artificial base, the outcome being a random variable able to take a value indicating normal event or disturbance,
   iii) defining a unit to be used as a measure of a disturbance frequency,
   iv) determining values of the disturbance frequency in circumstances that can be expected in operation of a process generating the disturbance to be monitored, said values including a critical value fC of the disturbance frequency where the monitoring nominally issues an alarm,
   v) determining for the process, at said critical value, a peakedness factor F, being a measure of how bursty the disturbances are, as the ratio of the variance to the mean of occurrences of disturbances in the process,
   vi) choosing for the algorithm an inertia value J being a measure of how fast or slowly the algorithm is desired to react to changes in the disturbance frequency, so as to achieve an acceptable compromise between speed and reliability of the monitoring,
   vii) calculating parameters for the monitoring based upon the disturbance frequency value fC, the peakedness factor F and the inertia value J, and using said parameters to calculate according to 1/fC*J*F a threshold value T of the counter considered to be unacceptable,
   iix) designing the algorithm for the monitoring with said parameters,
   ix) initiating the monitoring and waiting for results thereof,
   x) evaluating the results and, if necessary, adjusting the parameters.

2. A method according to claim 1, comprising using as a condition that the disturbance frequency measured against all base events is not different by more than a predetermined amount from the frequency measured just against normal events.

3. A method according to claim 2, wherein the evaluating step includes a step of determining the probability of obtaining a false result in the monitoring, based upon using a Leaky Bucket algorithm in which said probability is defined as u(d,b,h,F), wherein
   d=disturbance step is the amount by which a leaky bucket counter is incremented for each disturbance,
   b=bias is the expected change of a counter value after a base event, b<0 implying a false positive result obtained when alarm is given, and b>0 implying a false negative result obtained when no alarm is given,
   h=size of the bucket, measured in units of the disturbance step,
   F=peakedness factor for the disturbance process.

4. A method according to claim 2, using the Leaky Bucky algorithm, wherein the value for the inertia is used as a multiplier on the size of the leaky bucket.

5. A method according to claim 2, wherein the step of evaluating the results comprises a first substep of investigating whether measurements can be regarded as reliable, and, if yes, ending by taking no further action, a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and on a third substep level, performing either of the following three steps, (i) if there are more than a predetermined number of false alarms, increasing the value of fC, or increasing the value of J or F, by recalculating d and T and returning to first substep, (ii) if faulty equipment stays in service without raising an alarm, reducing fC, or reducing J or F, recalculating d and T and returning to the first substep, (iii) if the time to get results is more than a predetermined period of time, reducing the value of J or F, recalculating d and T and returning to the first substep.

6. A method according to claim 2, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

7. A method according to claim 2, comprising determining, besides the value of the critical frequency, the values of one or more of the following further levels of the disturbance frequency:

fN=normal frequency in operation;

fR=raised frequency in operation, but one that is still acceptable, fE=excessive frequency, at which the working of the equipment is degraded, fU=unacceptable frequency, where there are too many disturbances for normal operation.

8. A method according to claim 2, wherein the bursty behavior is considered solely on the basis of the peakedness factor, together with the disturbance frequency.

9. A method according to claim 1, comprising determining, besides the value of the critical frequency, the values of one or more of the following further levels of the disturbance frequency:

fN=normal frequency in operation, fR=raised frequency in operation, but one that is still acceptable, fE=excessive frequency, at which the working of the equipment is degraded, fU=unacceptable frequency, where there are too many disturbances for normal operation.

10. A method according to claim 9, wherein the step of evaluating the results comprises a first substep of investigating whether measurements can be regarded as reliable, and, if yes, ending by taking no further action, a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and on a third substep level, performing either of the following three steps, (i) if there are more than a predetermined number of false alarms, increasing the value of fC, or increasing the value of J or F, by recalculating d and T and returning to first substep, (ii) if faulty equipment stays in service without raising an alarm, reducing fC, or reducing J or F, recalculating d and T and returning to the first substep, (iii) if the time to get results is more than a predetermined period of time, reducing the value of J or F, recalculating d and T and returning to the first substep.

11. A method according to claim 9, using the Leaky Bucky algorithm, wherein the value for the inertia is used as a multiplier on the size of the leaky bucket.

12. A method according to claim 9, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

13. A method according to claim 9, wherein the evaluating step includes a step of determining the probability of obtaining a false result in the monitoring, based upon using a Leaky Bucket algorithm in which said probability is defined as $u(d,b,h,F)$, wherein d=disturbance step is the amount by which a leaky bucket counter is incremented for each disturbance, b=bias is the expected change of a counter value after a base event, $b<0$ implying a false positive result obtained when alarm is given, and $b>0$ implying a false negative result obtained when no alarm is given, h=size of the bucket, measured in units of the disturbance step, F=peakedness factor for the disturbance process.

14. A method according to claim 9, wherein the bursty behavior is considered solely on the basis of the peakedness factor, together with the disturbance frequency.

15. A method according to claim 1, wherein the bursty behaviour is considered solely on the basis of the peakedness factor, together with the disturbance frequency.

16. A method according to claim 15, wherein the step of evaluating the results comprises a first substep of investigating whether measurements can be regarded as reliable, and, if yes, ending by taking no further action, a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and on a third substep level, performing either of the following three steps, (i) if there are more than a predetermined number of false alarms, increasing the value of fC, or increasing the value of J or F, by recalculating d and T and returning to first substep,
(ii) if faulty equipment stays in service without raising an alarm, reducing fC, or reducing J or F, recalculating d and T and returning to the first substep,
(iii) if the time to get results is more than a predetermined period of time, reducing the value of J or F, recalculating d and T and returning to the first substep.

17. A method according to claim 15, using the Leaky Bucky algorithm, wherein the value for the inertia is used as a multiplier on the size of the leaky bucket.

18. A method according to claim 15, wherein the evaluating step includes a step of determining the probability of obtaining a false result in the monitoring, based upon using a Leaky Bucket algorithm in which said probability is defined as $u(d,b,h,F)$, wherein
   d=disturbance step is the amount by which a leaky bucket counter is incremented for each disturbance,
   b=bias is the expected change of a counter value after a base event, $b<0$ implying a false positive result obtained when alarm is given, and $b>0$ implying a false negative result obtained when no alarm is given,
   h=size of the bucket, measured in units of the disturbance step,
   F=peakedness factor for the disturbance process.

19. A method according to claim 15, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

20. A method according to claim 1, using the Leaky Bucket algorithm, wherein the value for the inertia is used as a multiplier on the size of the leaky bucket.

21. A method according to claim 20, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

22. A method according to claim 20, wherein the step of evaluating the results comprises
   a first substep of investigating whether measurements can be regarded as reliable, and, if yes, ending by taking no further action,
   a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and
   on a third substep level,
   performing either of the following three steps,
      (i) if there are more than a predetermined number of false alarms, increasing the value of fC, or increasing the value of J or F, by recalculating d and T and returning to first substep,
      (ii) if faulty equipment stays in service without raising an alarm, reducing fC, or reducing J or F, recalculating d and T and returning to the first substep,
      (iii) if the time to get results is more than a predetermined period of time, reducing the value of J or F, recalculating d and T and returning to the first substep.

23. A method according to claim 20, wherein the evaluating step includes a step of determining the probability of obtaining a false result in the monitoring, based upon using a Leaky Bucket algorithm in which said probability is defined as $u(d,b,h,F)$, wherein
   d=disturbance step is the amount by which a leaky bucket counter is incremented for each disturbance,
   b=bias is the expected change of a counter value after a base event, $b<0$ implying a false positive result obtained when alarm is given, and $b>0$ implying a false negative result obtained when no alarm is given,
   h=size of the bucket, measured in units of the disturbance step,
   F=peakedness factor for the disturbance process.

24. A method according to claim 1, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

25. A method according to claim 24, wherein the evaluating step includes a step of determining the probability of obtaining a false result in the monitoring, based upon using a Leaky Bucket algorithm in which said probability is defined as $u(d,b,h,F)$, wherein
   d=disturbance step is the amount by which a leaky bucket counter is incremented for each disturbance,
   b=bias is the expected change of a counter value after a base event, $b<0$ implying a false positive result obtained when alarm is given, and $b>0$ implying a false negative result obtained when no alarm is given,
   h=size of the bucket, measured in units of the disturbance step,
   F=peakedness factor for the disturbance process.

26. A method according to claim 24, wherein the step of evaluating the results comprises
   a first substep of investigating whether measurements can be regarded as reliable, and, if yes, ending by taking no further action,
   a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and
   on a third substep level,
   performing either of the following three steps, (i) if there are more than a predetermined number of false alarms, increasing the value of fC, or increasing the value of J or F, by recalculating d and T and returning to first substep, (ii) if faulty equipment stays in service without raising an alarm, reducing fC, or reducing J or F, recalculating d and T and returning to the first substep, (iii) if the time to get results is more than a predetermined period of time, reducing the value of J or F, recalculating d and T and returning to the first substep.

27. A method according to claim 1, wherein the step of evaluating the results comprises a first substep of investigating whether measurements can be regarded as reliable, and, if yes, ending by taking no further action, a second substep that, if the first substep reveals that measurements are not reliable, comprises investigating three possible sources of error, namely whether 1) there are too many false alarms, 2) faulty equipment stays in service, or 3) the time to get results is more than a predetermined period of time, and on a third substep level, performing either of the following three steps, (i) if there are more than a certain number of false alarms, increasing the value of fC, or increasing the value of J or F, by recalculating d and T and returning to first substep, (ii) if faulty equipment stays in service without raising an alarm, reducing fC, or reducing J or F, recalculating d and T and returning to the first substep, (iii) if the time to get results is more than a certain period of time, reducing the value of J or F, recalculating d and T and returning to the first substep.

28. A method according to claim 27, wherein the evaluating step includes a step of determining the probability of obtaining a false result in the monitoring, based upon using a Leaky Bucket algorithm in which said probability is defined as u(d,b,h,F), wherein d=disturbance step is the amount by which a leaky bucket counter is incremented for each disturbance, b=bias is the expected change of a counter value after a base event, b<0 implying a false positive result obtained when alarm is given, and b>0 implying a false negative result obtained when no alarm is given, h=size of the bucket, measured in units of the disturbance step, F=peakedness factor for the disturbance process.

29. A method according to claim 1, wherein the evaluating step includes a step of determining the probability of obtaining a false result in the monitoring, based upon using a Leaky Bucket algorithm in which said probability is defined as u(d,b,h,F), wherein d=disturbance step is the amount by which a leaky bucket counter is incremented for each disturbance, b=bias is the expected change of a counter value after a base event, b<0 implying a false positive result obtained when alarm is given, even though there is nothing wrong with a supervised object, and b>0 implying a false negative result obtained when no alarm is given, even though there is something wrong with the supervised object, h=size of the bucket, measured in units of the disturbance step, F=peakedness factor for the disturbance process.

30. A method according to claim 29, wherein the step of determining the probability of obtaining a false result includes the substeps of entering as parameters:

disturbance step d, bias b and size h of bucket, initializing as variables:

r=P{normal event}/P{disturbance}, wherein P{normal event} means probability of a normal event appearing and P{disturbance} means probability of a disturbance appearing, a=h*d being size of the bucket in units of 1, determining whether bias b=0, <0 or >0, calculating, if bias=0, boundaries of probability u(a/2), while using inequality $$\frac{(a-z)}{a} <= u(z) <= \frac{(a+d-z-1)}{(a+d-1)}$$

wherein u(z) means probability of hitting the floor of the bucket, given starting point z, producing upper and lower bounds, and average for the probability u(a/2), solving with binary search, if bias is not =0, the equation f(s)=r+s**(d+1)−(r+1)*s=0, in either the range 1<s<2 for b<0, or in the range 0<s<1 for b>0, wherein s is a dummy variable, calculating boundaries of probability u(a/2) using inequality $$\frac{(sa - sz)}{(sa - 1)} <= u(z) <= \frac{(s(a+d-1) - sz)}{(s(a+d-1) - 1)}$$

producing upper and lower bounds, and average, for probability u(a/2).

31. A method according to claim 30, wherein the step of determining the probability of obtaining a false result includes the substeps of entering as parameters:

disturbance step d, bias b, peakedness F and size h of bucket, initializing as variables:

a state transition probability matrix:

| base event | X(n+1) = 01 |
|---|---|
| base event | X(n) = 0 | where:

P>q and Q<p;

p=P{X(n)=normal event, 0 & X(n+1)=normal event, 0}, q=P{X(n)=normal event, 0 & X(n+1)=disturbance, 1}, Q=P{X(n)=disturbance, 1 & X(n+1)=normal event, 0}, P=P{X(n)=disturbance, 1 & X(n+1)=disturbance, 1};

the steady-state probabilities for the two-state model are:

x=P{x(n)=0}=Q/(Q+q)

y=P{x(n)=1}=q/(Q+q)

probability distribution for time=0, performing in a loop through time t while weight=>0.000001, weight being the probability of the counter remaining between the boundaries of the bucket, the substeps of calculating probability P{state=0 & counter=i} at time=t+1,
calculating probability P{state=1 & counter=i} at time=t+1,
calculating probability P{counter hitting floor or ceiling} at time=t+1,
calculating component of mean and mean square for duration of measurement at time=t+1,
calculating weight,
preparing for the next iteration of the loop by shifting values, and ending loop,
calculating variance and standard deviation of duration for the measurement,
producing probability of hitting floor and hitting ceiling,
producing mean and standard deviation of duration.

32. A method according to claim 1, wherein the step of determining the probability of obtaining a false result includes the substeps of
entering as parameters:
disturbance step d, bias b, peakedness F and size h of bucket,
initializing as variables:
a state transition probability matrix:
base event X(n+1)=01

$$\text{base event } X(n) = \begin{matrix} 0 \\ 1 \end{matrix}$$

where:
P>q and Q<p;
p=P{X(n)=normal event, 0 & X(n+1)=normal event, 0},
q=P{X(n)=normal event, 0 & X(n+1)=disturbance, 1},
Q=P{X(n)=disturbance, 1 & X(n+1)=normal event, 0},
P=P{X(n)=disturbance, 1 & X(n+1)=disturbance, 1};
the steady-state probabilities for the two-state model are:
x=P{x(n)=O}=Q/(Q+q)
y=P{x(n)=1 }=q/(Q+q)
probability distribution for time=0,
performing in a loop through time t while weight=>0.000001, weight being the probability of the counter remaining between the boundaries of the bucket, the substeps of
calculating probability P{state=0 & counter=i} at time=t+1,
calculating probability P{state=1 & counter=i} at time=t+1,
calculating probability P{counter hitting floor or ceiling} at time=t+1,
calculating component of mean and mean square for duration of measurement at time=t+1,
calculating weight,
preparing for the next iteration of the loop by shifting values, and ending loop,
calculating variance and standard deviation of duration for the measurement,
producing probability of hitting floor and hitting ceiling,
producing mean and standard deviation of duration.

33. A method for performing, in a computer-controlled process, an algorithm-controlled monitoring of disturbances which may occur at random or in bursts in the process, said monitoring using counting values obtained from a counter for counting said disturbances, said method comprising:
i) defining an abnormal event regarded to be a disturbance,
ii) defining a base against which disturbances are to be counted,
iii) defining a unit to be used as a measure of a disturbance frequency,
iv) determining values of the disturbance frequency in circumstances that can be expected in operation of a process generating the disturbance to be monitored, said values including a critical value fC of the disturbance frequency where the monitoring nominally issues an alarm,
v) determining for the process, at said critical value, a peakedness factor F, being a measure of how bursty the disturbances are, as the ratio of the variance to the mean of occurrences of disturbances in the process, wherein the bursty behaviour is considered solely on the basis of the peakedness factor, together with the disturbance frequency,
vi) choosing for the algorithm an inertia value J being a measure of how fast or slowly the algorithm is desired to react to changes in the disturbance frequency, so as to achieve an acceptable compromise between speed and reliability of the monitoring,
vii) calculating parameters for the monitoring based upon the disturbance frequency value fC, the peakedness factor F and the inertia value J, and using said parameters to calculate according to 1/fC*J*F a threshold value T of the counter considered to be unacceptable,
iix) designing the algorithm for the monitoring with said parameters,
ix) initiating the monitoring and waiting for results thereof,
x) evaluating the results and, if necessary, adjusting the parameters.

34. A method according to claim 33, wherein the step ii) of defining a base comprises determining whether the base should be a unit of time, a base event, or an artificial base, the outcome being a random variable able to take a value indicating normal event or disturbance.

35. A method according to claim 34, wherein the bursty behavior is considered solely on the basis of the peakedness factor, together with the disturbance frequency.

36. A method according to claim 34, comprising using as a condition that the disturbance frequency measured against all base events is not different by more than a predetermined amount from the frequency measured just against normal events.

37. A method according to claim 34, wherein the step of evaluating the results comprises
a first substep of investigating whether measurements can be regarded as reliable, and, if yes, ending by taking no further action,
a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and on a third substep level, performing either of the following three steps,
(i) if there are more than a predetermined number of false alarms, increasing the value of fC, or increasing the value of J or F, by recalculating d and T and returning to first substep,
(ii) if faulty equipment stays in service without raising an alarm, reducing fC, or reducing J or F, recalculating d and T and returning to the first substep,
(iii) if the time to get results is more than a predetermined period of time, reducing the value of J or F, recalculating d and T and returning to the first substep.

38. A method according to claim 34, wherein the evaluating step includes a step of determining the probability of obtaining a false result in the monitoring, based upon using a Leaky Bucket algorithm in which said probability is defined as u(d,b,h,F), wherein
d=disturbance step is the amount by which a leaky bucket counter is incremented for each disturbance,
b=bias is the expected change of a counter value after a base event, b<0 implying a false positive result obtained when alarm is given, and b>0 implying a false negative result obtained when no alarm is given,
h=size of the bucket, measured in units of the disturbance step,
F=peakedness factor for the disturbance process.

39. A method according to claim 34, comprising determining, besides the value of the critical frequency, the values of one or more of the following further levels of the disturbance frequency:
fN=normal frequency in operation;
fR=raised frequency in operation, but one that is still acceptable,
fF=excessive frequency, at which the working of the equipment is degraded,
fU=unacceptable frequency, where there are too many disturbances for normal operation.

40. A method according to claim 34, using the Leaky Bucky algorithm, wherein the value for the inertia is used as a multiplier on the size of the leaky bucket.

41. A method according to claim 34, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

42. A method according to claim 33, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

43. A method according to claim 33, wherein the evaluating step includes a step of determining the probability of obtaining a false result in the monitoring, based upon using a Leaky Bucket algorithm in which said probability is defined as u(d,b,h,F), wherein
d=disturbance step is the amount by which a leaky bucket counter is incremented for each disturbance,
b=bias is the expected change of a counter value after a base event, b<0 implying a false positive result obtained when alarm is given, and b>0 implying a false negative result obtained when no alarm is given,
h=size of the bucket, measured in units of the disturbance step,
F=peakedness factor for the disturbance process.

44. A method according to claim 33, wherein the step of evaluating the results comprises
a first substep of investigating whether measurements can be regarded as reliable, and, if yes, ending by taking no further action,
a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and
on a third substep level,
performing either of the following three steps,
(i) if there are more than a predetermined number of false alarms, increasing the value of fC, or increasing the value of J or F, by recalculating d and T and returning to first substep,
(ii) if faulty equipment stays in service without raising an alarm, reducing fC, or reducing J or F, recalculating d and T and returning to the first substep,
(iii) if the time to get results is more than a predetermined period of time, reducing the value of J or F, recalculating d and T and returning to the first substep.

45. A method according to claim 33, comprising determining, besides the value of z the critical frequency, the values of one or more of the following further levels of the disturbance frequency:
fN=normal frequency in operation;
fR=raised frequency in operation, but one that is still acceptable,
fE=excessive frequency, at which the working of the equipment is degraded,
fU=unacceptable frequency, where there are too many disturbances for normal operation.

46. A method according to claim 33, using the Leaky Bucket algorithm, wherein the value for the inertia is used as a multiplier on the size of the leaky bucket.

47. A method for performing, in a computer-controlled process, an algorithm-controlled monitoring of disturbances which may occur at random or in bursts in the process, said monitoring using counting values obtained from a counter for counting said disturbances, said method comprising:
i) defining an abnormal event regarded to be a disturbance,
ii) defining a base against which disturbances are to be counted, comprising determining whether the base should be a unit of time, a base event, or an artificial base, the outcome being a random variable able to take a value indicating normal event or disturbance, iii) defining a unit to be used as a measure of a disturbance frequency, iv) determining values of the disturbance frequency in circumstances that can be expected in operation of a process generating the disturbance to be monitored, said values including a critical value fC of the disturbance frequency where the monitoring nominally issues an alarm, v) determining for the process, at said critical value, a peakedness factor F, being a measure of how bursty the disturbances are, as the ratio of the variance to the mean of occurrences of disturbances in the process, vi) choosing for the algorithm an inertia value J being a measure of how fast or slowly the algorithm is desired to react to changes in the disturbance frequency, so as to achieve an acceptable compromise between speed and reliability of the monitoring, vii) calculating parameters for the monitoring based upon the disturbance frequency value fC, the peakedness factor F and the inertia value J, and using said parameters to calculate according to 1/fC*J*F a threshold value T of the counter considered to be unacceptable, iix) designing the algorithm for the monitoring with said parameters, ix) initiating the monitoring and waiting for results thereof, x) evaluating the results and, if necessary, adjusting the parameters, comprising a first substep of investigating whether measurements can be regarded as reliable, and, if yes, ending by taking no further action, a second substep that, if the first substep reveals that measurements are not reliable, comprises investigating three possible sources of error, namely whether 1) there are more than a predetermined number of false alarms, 2) faulty equipment stays in service, or 3) the time to get results is more than a predetermined period of time, and on a third substep level, performing either of the following three steps, (i) if there are more than a predetermined number of false alarms, increasing the value of fC, or increasing the value of J or F, by recalculating d and T and returning to first substep, (ii) if faulty equipment stays in service without raising an alarm, reducing fC, or reducing J or F, recalculating d and T and returning to the first substep, (iii) if the time to get results is too long, reducing the value of J or F, recalculating d and T and returning to the first substep.

48. A method according to claim 47, comprising determining, besides the value of the critical frequency, the values of one or more of the following further levels of the disturbance frequency:

fN=normal frequency in operation;

fR=raised frequency in operation, but one that is still acceptable, fE=excessive frequency, at which the working of the equipment is degraded, fU=unacceptable frequency, where there are too many disturbances for normal operation.

49. A method according to claim 47, wherein the evaluating step includes a step of determining the probability of obtaining a false result in the monitoring, based upon using a Leaky Bucket algorithm in which said probability is defined as u(d,b,h,F), wherein d=disturbance step is the amount by which a leaky bucket counter is incremented for each disturbance, b=bias is the expected change of a counter value after a base event, b<0 implying a false positive result obtained when alarm is given, and b>0 implying a false negative result obtained when no alarm is given, h=size of the bucket, measured in units of the disturbance step, F=peakedness factor for the disturbance process.

50. A method according to claim 47, wherein the step ii) of defining a base comprises determining whether the base should be a unit of time, a base event, or an artificial base, the outcome being a random variable able to take a value indicating normal event or disturbance.

51. A method according to claim 47, wherein the bursty behavior is considered solely on the basis of the peakedness factor, together with the disturbance frequency.

52. A method according to claim 47, using the Leaky Bucky algorithm, wherein the value for the inertia is used as a multiplier on the size of the leaky bucket.

53. A method according to claim 47, including the step of producing a risk table including a number of columns, of which four columns contain, in turn, level of disturbance frequency, bias, being expected change of a counter value after a base event, value of the disturbance frequency, and risk of false result, respectively, by selecting a suitable set of values of the bias, calculating values of the disturbance frequency by adjusting the critical frequency with the respective values of the bias, and setting values for risks based upon measurements, economic analysis, experience, judgement or intuition.

54. A method comprising determining the probability of false results in an algorithm-controlled monitoring of disturbances performed in a computer-controlled process, wherein the disturbances may occur at random or in bursts in the process, said monitoring using counting values obtained from a counter for counting said disturbances, said monitoring comprising the steps of defining an abnormal event regarded to be a disturbance, defining a base against which disturbances are to be counted, and defining a unit to be used as a measure of a disturbance frequency, the method further comprising:

determining the probability based upon using a Leaky Bucket algorithm in which said probability is defined as u(d,b,h,F), wherein d=disturbance step is the amount by which a leaky bucket counter is incremented for each disturbance, b=bias is the expected change of a counter value after a base event, b<0 implying a false positive result obtained when alarm is given, even though there is nothing wrong with a supervised object, and b>0 implying a false negative result obtained when no alarm is given, even though there is something wrong with the supervised object, h=size of the bucket, measured in units of the disturbance step, F=peakedness factor for the disturbance process, being a measure of how bursty the disturbances are, entering d, b and h as parameters initializing as variables:

r=P{normal event}/P{disturbance}, wherein P{normal event} means probability of a normal event appearing and P{ disturbance} means probability of a disturbance appearing, a=h*d being size of the bucket in units of 1, there is determined whether bias b=0, <0 or >0. calculating, if bias=0, boundaries of probability u(a/2), while using inequality $$\frac{(a-z)}{a} <= u(z) <= \frac{(a+d-z-1)}{(a+d-1)}$$

wherein u(z) means probability of hitting the floor of the bucket, given starting point z, producing upper and lower bounds, and average for the probability u(a/2), solving with binary search, if bias is not=0, the equation $f(s)=r+s^{**}(d+1)-(r+1)^{*}s=0$, in either the range 1<s<2 for b<0, or in the range 0 <s <1 for b>0, wherein s is a dummy variable, calculating boundaries of probability $u(a/2)$ using inequality $$\frac{(sa - sz)}{(sa - 1)} <= u(z) <= \frac{(s(a+d-1) - sz)}{(s(a+d-1) - 1)}$$

producing upper and lower bounds, and average, for probability u(a/2).

55. A method for determining the probability of false results in an algorithm-controlled monitoring of disturbances performed in a computer-controlled process, wherein the disturbances are apt to occur at random or in bursts in the process, said monitoring using counting values obtained from a counter for counting said disturbances, said monitoring comprising the steps of defining an abnormal event regarded to be a disturbance, defining a base against which disturbances are to be counted, and defining a unit to be used as a measure of a disturbance frequency, the method comprising:
determining the probability based upon using a Leaky Bucket algorithm in which said probability is defined as u(d,b,h,F), wherein
d=disturbance step is the amount by which a leaky bucket counter is incremented for each disturbance,
b=bias is the expected change of a counter value after a base event, b<0 implying a false positive result obtained when alarm is given, even though there is nothing wrong with a supervised object, and b>0 implying a false negative result obtained when no alarm is given, even though there is something wrong with the supervised object,
h=size of the bucket, measured in units of the disturbance step,
F=peakedness factor for the disturbance process, being a measure of how bursty the disturbances are,
entering d, b and h as parameters
initializing as variables:
a state transition probability matrix:

base event $X(n+1) = 0\ 1$ base event $X(n) = \begin{matrix} 0 \\ 1 \end{matrix}$ where:
P>q and Q<p;
p=P{X(n)=normal event, 0 & X(n+1)=normal event, 0},
q=P{X(n)=normal event, 0 & X(n+1)= disturbance, 1},
Q=P{X(n)=disturbance, 1 & X(n+1)=normal event, 0},
P=P{X(n)=disturbance, 1 & X(n+1)= disturbance, 1};
the steady-state probabilities for the two-state model are:
x=P{x(n)=0}=Q/(Q+q)
y=P{x(n)=1}=q/(Q+q)
probability distribution for time=0,
performing in a loop through time t while weight=>0.000001, weight being the probability of the counter remaining between the boundaries of the bucket, the substeps of
calculating probability P{state=0 & counter=i} at time=t+1,
calculating probability P{state=1 & counter=i} at time=t+1,
calculating probability P{counter hitting floor or ceiling} at time=t+1,
calculating component of mean and mean square for duration of measurement at time= t+1,
calculating weight,
preparing for the next iteration of the loop by shifting values, and ending loop,
calculating variance and standard deviation of duration for the measurement,
producing probability of hitting floor and hitting ceiling,
producing mean and standard deviation of duration.

* * * * *